United States Patent [19]

Limonchik et al.

[11] 4,298,396
[45] Nov. 3, 1981

[54] PITCH COMPOSITIONS

[75] Inventors: Abe Limonchik, Montreal; Neil G. Richardson, St. Laurent, both of Canada

[73] Assignee: Domtar Inc., Montreal, Canada

[21] Appl. No.: 142,226

[22] Filed: Apr. 21, 1980

[51] Int. Cl.$^3$ .............................................. C08L 95/00
[52] U.S. Cl. ............................... 106/273 R; 106/284; 208/44
[58] Field of Search ............... 106/18.24, 18.14, 18.19, 106/284; 208/23, 44, 47

[56] References Cited

U.S. PATENT DOCUMENTS

| | | | |
|---|---|---|---|
| 2,025,929 | 12/1930 | Young | 106/18.24 |
| 3,151,992 | 10/1964 | Blair et al. | 106/18.24 |
| 3,342,614 | 9/1967 | Koons | 106/16 |
| 3,347,685 | 10/1967 | Blair et al. | 106/16 |
| 3,353,978 | 11/1967 | Davie | 106/284 |
| 3,442,989 | 5/1969 | Hildebrandt | 106/284 |
| 4,022,945 | 5/1977 | MacKenzie, Jr. et al. | 106/18.24 |

FOREIGN PATENT DOCUMENTS 979561 12/1975 Canada .............................. 106/18.19

Primary Examiner—John Kight, III
Assistant Examiner—Amelia B. Yarbrough

[57] ABSTRACT

The pitch compositions taught herein, upon carbonization, result in relatively oxidation-resistant carbon bodies. The compositions comprise pitch containing therein small quantities of fire retardant-like compositions having afterglow-inhibiting properties and which comprise halogenated organic compounds.

8 Claims, No Drawings

PITCH COMPOSITIONS

FIELD OF INVENTION

The present invention relates to pitch compositions, which produce oxidation-resistant carbon bodies.

BACKGROUND OF INVENTION/PRIOR ART

A preponderant number of applications which entail the use of coal tar or petroleum pitches require the carbonization of the pitch material. Examples of carbonization processes include coking and graphitization. During the carbonization process, it is normal to lose between 25 and 65% of the binder, the exact loss being dependent on the volatile content of the pitch. The loss of volatiles to the environment is additionally undesirable in that they constitute a source of air pollution. It is common practice in the industry to indicate this weight loss by the fraction of the starting material which remains upon carbonization, eg. the fraction of the material remaining upon coking is called the "coking value" of the pitch. This characteristic is particularly important if the pitch is to be used as a binder for coke filler in the formation of coked carbon bodies.

A problem encountered with baked carbon bodies obtained from pitches is their relatively high oxidation rate, which is particularly noticeable when they are used as refractory materials or as electrodes. This oxidation rate can be attributed to such factors as the porosity of the can be attributed to such factors as the porosity of the carbon body, its specific surface and the inorganic impurities present in the carbon body.

Techniques hitherto employed to decrease this oxidation rate include pressure impregnation or coating of previously baked carbon bodies with aqueous solutions of oxidation retardant materials such as phosphates, silicates, etc., after which the carbon bodies are rebaked to drive away the moisture. While the former technique requires pressure treating equipment and large volumes of an often expensive impregnant, neither technique succeeds in inhibiting oxidation throughout the interior of the carbon body.

It is also known (British Pat. No. 865,320) to add oxidation inhibitors to the coke filler-pitch mix before baking. This technique has the disadvantage of requiring large amounts (4 to 20 parts by weight of the additive to 100 parts by weight of the corresponding mix) of the additive, which is expensive in comparison to the base material being treated. Such large amounts of additive can also have a deleterious effect if the carbon body resulting upon baking this mix, is used as an electrode. Additionally, the additive, normally being incombustible constitutes a substantial portion of the electrode which can contaminate the product as the electrode is consumed should any residue be left behind.

It is therefore the object of the present invention to provide a pitch composition, which upon carbonization yields a carbon body having improved oxidation resistance.

BRIEF DESCRIPTION OF THE INVENTION

The present invention relates to a pitch composition comprising:
(A) a pitch material, and
(B) an effective amount of an active component comprising at least one of a class of halogenated organic compounds which decompose at temperatures between the softening point and the carbonization temperature of the pitch material,
wherein said component constitutes at most 2% of said composition. In another aspect, the present invention relates to a process for making said pitch composition.

DETAILED DESCRIPTION OF THE INVENTION

According to the present invention, a pitch composition having modified properties is prepared by the incorporation into pitch of a compound (or compounds) selected from the group of compounds indicated above. The addition to pitch is carried out at a temperature at which the pitch has a reduced viscosity thus permitting easy stirrability. The temperature at which this component will be incorporated into the pitch will preferably be between the softening point of the pitch material and the temperature at which the low boiling components in the pitch are lost, in order to at least partially prevent their loss. The latter temperature will be about 250°–300° C. The compound is incorporated into the pitch merely by stirring the additive into the pitch. The compound should be added in a state which permits it to be easily distributed throughout the pitch e.g. if the additive is solid at the temperature of addition it should be in a finely comminuted form (about 100 mesh) before addition, or if it is a gas, it may be incorporated by sparging it through the molten pitch. Normally the additive will constitute less than about 2% by weight of the mixture while more typically it will constitute less than about 1% by weight.

The compounds mentioned earlier are often used as fire-retardants which demonstrate afterglow inhibition and can be broadly described as those which decompose at temperatures between the softening point and the carbonization halogenated organics temperature of the pitch. Such a restriction would ensure that the component is capable of being distributed in its "active" form throughout the pitch, and this "active" form exists before the pitch material is carbonized. By carbonization, it is intended to imply a state of carbon formation such that the dispersion and "activity" of the compounds is inhibited by the formation of a coke phase. The formation of such a coke phase will usually be substantially complete by about 500° C. and accordingly the introduction of the compound into the pitch and its distribution in its "active" form throughout the pitch should take place at a temperature below this carbonization temperature.

The compounds will typically have boiling points above about 40° C. Examples of such compounds are chlorinated rubbers (such as "Parlon" TM), 1-chloronaphthalene, hexachlorobenzene, pentachloroethane and 1–2 dichloroethane, etc. However the use of similar compounds, in an analogous manner, or formation insitu (eg. by the sparging of chlorine gas through the molten pitch) should be evident to persons skilled in the art. The resultant pitch composition will normally contain less than about 0.4% by weight of chlorine. The use of large excesses of the active component could, in fact, decrease or eliminate the gains accruing from the practice of this invention. Accordingly, the level of the component in the pitch should be carefully determined for the given component-pitch combination. Similar and equivalently useful compositions which lie within the ambit of the invention are commercially used fire retardants such as those sold under the trademark "Phosgard" and having the general formula

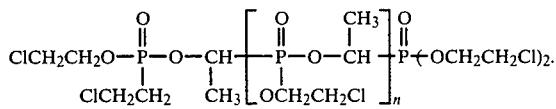

The pitch composition is prepared by heating the pitch to a temperature above its softening point in order to render it stirrable. If the additive is a solid it should be finely ground before addition to the pitch in order to facilitate its distribution throughout the pitch. The additive is stirred into the pitch and the stirring is normally continued for a few hours until the additive is believed to be distributed throughout the pitch. In the case when the additive is gaseous, and the compound is formed insitu, as in the case of chlorine gas which can be added by sparging the gas through the molten pitch while it is stirred thus permitting reaction of the gas with the pitch components, thereby forming the desired compound insitu.

The pitch composition prepared according to the present invention will contain an effective amount of the active component which will be less than about 2% by weight of the composition. The minimum amount will normally not be less than 0.1%. This composition when coked, (or otherwise carbonized) will result in a carbon body having improved oxidation resistance. In practice, this level of addition will be determined by successive trials, and in most cases will be less than about 0.8 percent by weight of the pitch. It should be noted that the various compounds which fall within this class of halogenated organic compounds need not be used in a mutually exclusive fashion and various combinations may be employed.

There are usually other advantages which accompany the formation of a relatively oxidation-resistant carbon body from the pitch composition of this invention. One of the most desirable and frequently encountered characteristics of these pitch compositions is the increase in yield of carbonaceous material from a given amount of pitch, following incorporation of the additive therein. More particularly when such a pitch is coked, there is usually an increase in the coking value of the pitch. While there are additive levels which correspond to a maximum in the carbonization value for the composition, it should be noted that these levels can be quite distinct from the respective additive levels for a minimum in the oxidation rate. The level of additive employed in practice will therefore be dependent upon the desired characteristics.

Depending on the additive used, further advantages can accrue to the user of the composition. For example, the use of Phosgard TM as the additive results in the use of diminished quantities of the pitch to form an adequately extrudable electrode.

It is not entirely clear how the addition of such miniscule quantities of the additive can affect the oxidation rate so greatly. A mechanism postulated to explain this outcome is the reaction between the additive and the constituents of the pitch which tend to catalyze the oxidation of the carbon body. The additive may alternatively effect changes in the structure of the resultant carbon body thus rendering it oxidation-resistant.

EXAMPLE 1

This example illustrates the effect on pitch of the addition of Phosgard TM thereto. The Phosgard TM and the pitch were weighed into a beaker, the mixture heated to about 190° C. to facilitate stirring. The mixture was stirred with a variable speed heavy duty stirrer at 190°±10° C. for about 90 minutes.

A variety of pitches having various levels of quinoline insoluble (Q.I.) and iron content were treated according to this technique. Each pitch was treated with different levels of "Phosgard" TM to test the variation of the pitch properties as a function of the additive level.

The pitch additive mixtures were coked in crucibles containing 5 g of the mixture using a 24 hour carbonization cycle at a heating rate of 40° C./hr. The resulting coke was weighed to obtain the coking value of the treated pitch.

The coke was crushed and 2 g. of the 40/60 mesh fraction were charged to a tube. This sample was purged with nitrogen for 30 minutes to remove moisture and oxygen. With the nitrogen flowing, the tube was placed in a furnace set at an average temperature of 950°±5° C. When the sample had attained uniform temperature, the supply of nitrogen was cut off and carbon dioxide was passed through the sample for two hours. At the end of two hours, the passage of carbon dioxide through the sample was stopped and nitrogen was passed through the sample for 30 minutes to purge it of the residual gaseous oxidation products. The sample was then removed from the furnace, cooled and then reweighed. The average carbon dioxide oxidation rate was obtained from these two weighings. This form of oxidation is believed to be the principal source of oxidation within the carbon anode during the electrolytic production of aluminum, contributing to the loss of electrode strength. The carbon dioxide oxidation is also believed to be responsible for the accelerated consumption of the binder at the interface between the filler carbon and binder and at the anode-salt interface.

The results which are summarized in Table I below illustrate the variation in the coking value and the carbon dioxide oxidation rate with the Q.I. and iron content, as well as the different additive levels corresponding to the optimum coking value and the optimum carbon dioxide reaction rate for a given pitch. It will additionally be evident upon an examination of the entries in Table I, that in some of the cases (eg. pitches (b) and (c)) there exist optimum levels of Phosgard TM addition and an excess of the additive can have a deleterious effect on the carbon dioxide oxidation rate. Similarly, there is a decrease in the rate of increase in the coking value with increases in the level of the additive beyond the optimum level.

TABLE I

| Pitch | Q.I. (%) (Fe ppm) | Phosgard Added (%) | Coking Value (%) | CO$_2$ Reaction Rate (% Burnoff/hr) |
|---|---|---|---|---|
| (a) | 6.1 (3300) | 0.0 | 49.4 | 5.50 |
|  |  | 0.2 | 51.1 | 5.60 |
|  |  | 0.4 | 49.8 | 5.05 |
|  |  | 0.8 | 49.6 | 2.00 |
|  |  | 1.5 | 49.7 | 1.70 |
| (b) | 14.1 (206) | 0 | 65.3 | 0.67 |
|  |  | 0.4 | 64.1 | 0.57 |
|  |  | 0.6 | 63.8 | 0.42 |
|  |  | 0.8 | 64.1 | 0.51 |
|  |  | 1.0 | 64.7 | 0.50 |
| (c) | 19.0 (77) | 0 | 66.3 | 0.69 |
|  |  | 0.2 | 66.8 | 0.41 |
|  |  | 0.4 | 67.4 | 0.32 |
|  |  | 0.6 | 67.9 | 0.34 |

TABLE I-continued

| Pitch | Q.I. (%) (Fe ppm) | Phosgard Added (%) | Coking Value (%) | CO2 Reaction Rate ( % Burnoff/hr ) |
|---|---|---|---|---|
| | | 0.8 | 68.5 | 0.42 |
| | | 1.0 | 68.6 | 0.49 |
| | | 1.2 | 68.8 | 0.44 |
| (d) | 25.0 (115) | 0 | 65.2 | 0.10 |
| | | 0.2 | 66.8 | 0.12 |
| | | 0.3 | 68.8 | — |
| | | 0.4 | 69.2 | 0.13 |
| | | 0.6 | 69.4 | 0.10 |
| | | 0.8 | 69.6 | — |
| (e) | 35.0 (465) | 0 | 66.95 | 0.47 |
| | | 0.2 | 69.50 | 0.27 |
| | | 0.4 | 68.10 | 0.05 |
| (f) | 19.0* | 0 | 60.2 | 0.62 |
| | (280) | 0.2 | 62.8 | 0.33 |
| | | 0.4 | 62.2 | 0.07 |

*50:50 mixture of coal tar pitch (e) and petroleum pitch.

EXAMPLE 2

This example illustrates the change in the properties of an electrode pitch treated according to the present invention. Coal tar pitch containing 25% Q.I. (identical to pitch (d) of Example 1) was treated with 0.4% by weight of "Phosgard" TM.

Samples of pitch with and without "Phosgard" TM were mixed with filler coke in an amount corresponding to about 70% of the coke-pitch mixture to form a Soderberg paste with acceptable flow characteristics. The required amount was determined by the elongation test, and is termed the "binder requirement". Upon addition of "Phosgard" TM, it was noted that the binder required for an acceptable paste diminished by about 6.25%.

The Soderberg paste was baked for 48 hours at a temperature of 970° C. to form the test electrodes and the coking value of the pitch in the paste was determined. These test electrodes were then evaluated as to their air-oxidation susceptibility. A test electrode 50 mm in length and 20 mm in diameter was suspended from a torque balance in a vertical tube furnace with forced air at about 525° C. flowing past at a rate of 4 l/m (corresponding to a linear velocity of 22 cm/s). Readings were taken on the torque balance at 5 minute intervals until the weight of the specimen had decreased by 30%. The rate of oxidation was expressed in g.cm.$^{-2}$h.$^{-1}$ and is tabulated in Table II. Addition of "Phosgard" TM noticeably decreased the air-oxidation rate. Other properties of the electrode such as resistivity and air permeability were measured and their values are summarized in Table II below.

Tests identical to the preceding were carried out with a 19% Q.I. pitch (pitch (c) of Example 1) which contained 0, 0.6 and 1.2% by weight of added "Phosgard" TM. These results are also summarized in Tables II. It is readily noted that the resistivity, air permeability and air oxidation rate values obtained show similar quantitative variations with improvements being demonstrated in each upon addition of "Phosgard" TM to an optimum value, and a loss of the improvement upon further addition of "Phosgard" TM, (eg. between (c) .2 and (c) .3, as reflected in resistivity, air permeability and air oxidation values). In fact, the values of the air permeability and the air oxidation rate are higher with 1.2% Phosgard TM than in its absence.

TABLE II

| Sample | Q.I. (%) | Added "Phosgard" (TM) (%) | Coking Values (%) | Binder Requirement (%) | Resistivity (ohm cm.$^{-1}$) | Air Permeability | Air Oxidation Rate (g/cm$^2$h) |
|---|---|---|---|---|---|---|---|
| (d).1 | 25 | — | 64.5 | 33.8 | 67 | 31 | 0.10 |
| (d).2 | 25 | 0.4 | 66.4 | 32.0 | 64 | 26 | 0.04 |
| (c).1 | 19 | — | 63.5 | 32.0 | 68 | 58 | 0.12 |
| (c).2 | 19 | 0.6 | 65.0 | 30.2 | 65 | 51 | 0.07 |
| (c).3 | 19 | 1.2 | 65.1 | 30.0 | 66 | 65 | 0.13 |

EXAMPLE 3

The effect of "Phosgard" TM addition to petroleum pitches was tested in a series of experiments in which varying quantities of "Phosgard" TM were incorporated in the pitch by a method similar to that used in Example 1. The pitch additive mixtures were then coked in a fashion identical to that used in Example 1, yielding the coking values of the treated pitches. The results are tabulated in Table IV below and show an increase in the coking value corresponding to an increase in the "Phosgard" TM added to the pitch.

TABLE III

| Added "Phosgard" (TM) (% by wt) | Coking Value (%) |
|---|---|
| 0 | 48.1 |
| 0.3 | 48.9 |
| 0.6 | 49.7 |
| 0.8 | 49.9 |
| 1.0 | 50.1 |
| 1.4 | 50.4 |

EXAMPLE 4

A 19% Q.I. coal tar pitch (pitch (c) of Example 1) was mixed with a chlorinated rubber, sold under the trademark "Parlon S-30;" and coked in substantially the same manner as in Example 1. The coking value, density and the carbon dioxide reaction rate were measured. This was repeated using hexachlorobenzene, pentachloroethane, 1-chloronaphthalene and 1,2 dichloroethane as the additives to the pitch. The results which are summarised in Table V below, indicate the degree to which the coking value and the carbon dioxide reaction rate are influenced by the additive

TABLE V

| Compound added | Boiling point (°C.) | Chlorine added (ppm) | Coking Value (%) | Density (g/cm$^3$) | CO$_2$ Reaction Rate (burnoff/hr.) |
|---|---|---|---|---|---|
| None | — | — | 66.3 | 0.987 | 0.69 |
| Chlorinated Rubber ("Parlon S-30" (TM)) | N.A | 1620 | 69.6 | 0.995 | 0.29 |
| Chlorinated Rubber ("Parlon S-30" (TM)) | | 3240 | 69.2 | 0.998 | 0.21 |

TABLE V-continued

| Compound added | Boiling point (°C.) | Chlorine added (ppm) | Coking Value (%) | Density (g/cm³) | CO₂ Reaction Rate (burnoff/hr.) |
|---|---|---|---|---|---|
| Hexachlorobenzene | 326 | 1620 | 69.3 | 1.000 | 0.24 |
| Hexachlorobenzene | 326 | 3240 | 70.1 | 1.015 | 0.26 |
| Pentachloroethane | 162 | 1620 | 69.0 | 1.011 | 0.32 |
| Pentachloroethane | 162 | 3240 | 68.7 | 1.017 | 0.34 |
| 1-Chloronaphthalene | 263 | 1620 | 69.0 | 1.008 | 0.27 |
| 1-Chloronaphthalene | 263 | 3240 | 68.7 | 1.007 | 0.26 |
| 1, 2 dichloroethane | 83.5 | 1620 | 68.5 | 1.011 | 0.31 |
| 1, 2 dichloroethane | 83.5 | 3240 | 68.9 | 1.017 | 0.5 |

Modifications to the above will be evident to those skilled in the art without departing from the spirit of the invention as defined in the appended claims.

The embodiments of the present invention in which an exclusive property or privilege is claimed are as follows:

1. A pitch composition comprising:
   (a) a pitch material; and
   (b) an active component comprising at least one of a class of:
   halogenated organic compounds which decompose at temperatures between the softening point and the carbonization temperature of the pitch material,
   wherein said component is present in an amount effective to reduce significantly the carbon dioxide oxidation rate of the carbonization product of said pitch composition relative to the carbon dioxide oxidation rate of the carbonization product of said pitch material and constitutes at most 2% by weight of said composition.

2. A composition as defined in claim 1 wherein said halogenated organic compounds are chosen from the group comprising chlorinated rubbers, 1-chloronaphthalene, hexachlorobenzene, pentachloroethane and 1,2 dichloroethane.

3. A composition as defined in claim 1, wherein said halogenated organic compound is chosen from the class of compounds having the general formula:

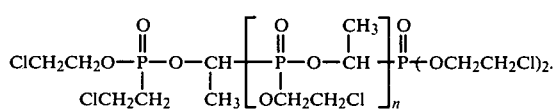

4. A process for making a pitch composition comprising mixing an active component with a pitch material at a temperature at least equal to the softening point of said pitch material, and wherein said component comprises at least a member chosen from the group consisting of halogenated organic compounds which decompose at temperatures between the softening point and the carbonization temperature of the pitch material,
wherein said component is present in an amount effective to reduce significantly the carbon dioxide rate of the carbonization product of said pitch composition relative to the carbon dioxide oxidation rate of the carbonization product of said pitch material and constitutes at most 2% by weight of said composition.

5. A process as defined in claim 4, wherein said temperature of said pitch is at most 300° C.

6. A process as defined in claim 4 or 5, wherein said halogenated organic compounds are introduced into said pitch material by the passage of a chlorine-containing gas through said pitch material.

7. A process as defined in claims 4 or 5, wherein said halogenated organic compounds are chosen from the group comprising chlorinated rubbers, 1-chloronaphthalene, hexachlorobenzene, pentachloroethane and 1,2 dichloroethane.

8. A process as defined in claims 4 or 5, wherein said halogenated organic compounds are chosen from the class of compounds having the general formula:

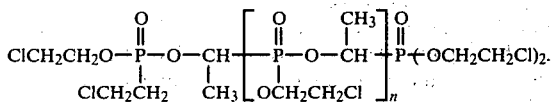

* * * * *